No. 623,462. Patented Apr. 18, 1899.
C. F. CARLSON.
SHAFT FOR TWO WHEELED VEHICLES.
(Application filed Dec. 3, 1898.)

(No Model.) 2 Sheets—Sheet 1.

WITNESSES
Geo. E. Frech.
Chas. R. Wright Jr.

INVENTOR
Charles F. Carlson
by A. S. Pattison
Attorney

No. 623,462. Patented Apr. 18, 1899.
C. F. CARLSON.
SHAFT FOR TWO WHEELED VEHICLES.
(Application filed Dec. 3, 1898.)

(No Model.) 2 Sheets—Sheet 2.

WITNESSES
Geo. E. Frech.
Chas. R. Wright Jr.

INVENTOR
Charles F. Carlson
by A. S. Pattison
Attorney

UNITED STATES PATENT OFFICE.

CHARLES F. CARLSON, OF KILAUEA, HAWAII.

SHAFT FOR TWO-WHEELED VEHICLES.

SPECIFICATION forming part of Letters Patent No. 623,462, dated April 18, 1899.

Application filed December 3, 1898. Serial No. 698,186. (No model.)

*To all whom it may concern:*

Be it known that I, CHARLES FRITZ CARLSON, a citizen of the United States, residing at Kilauea, in the Island of Kauai, Hawaii, have invented new and useful Improvements in Shafts for Two-Wheeled Vehicles, of which the following is a specification.

My invention relates to improvements in shafts for two-wheeled vehicles, and pertains to a construction whereby the inner ends of the shaft are pivotally connected with the body of the vehicle.

This invention pertains to a spring for connecting the inner ends of the shaft to the body of the vehicle, and also to a peculiar hinge whereby the movement of the body in respect to the shaft is limited.

The object of my invention is to provide an improved coupling for the inner ends of the shaft that will obviate the jolting of the horse in two-wheeled vehicles, also the squeaking or grinding noise of sliding springs and the wearing out of rubber packing that is ordinarily used at present in such vehicles, whereby the vehicle is as easy and noiselessly riding as a four-wheeled vehicle.

Figure 1:
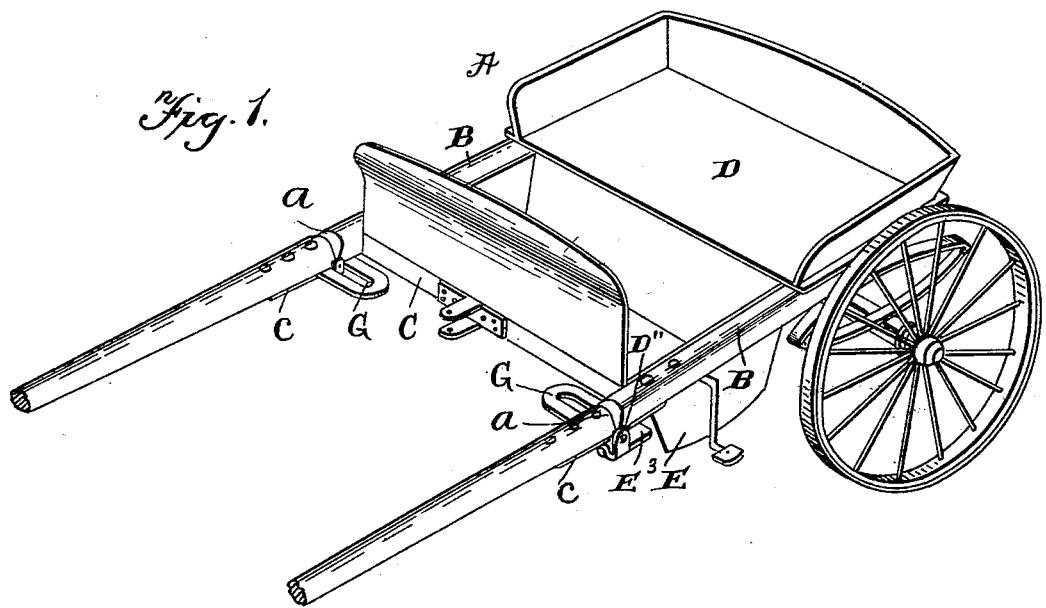
Figure 2:
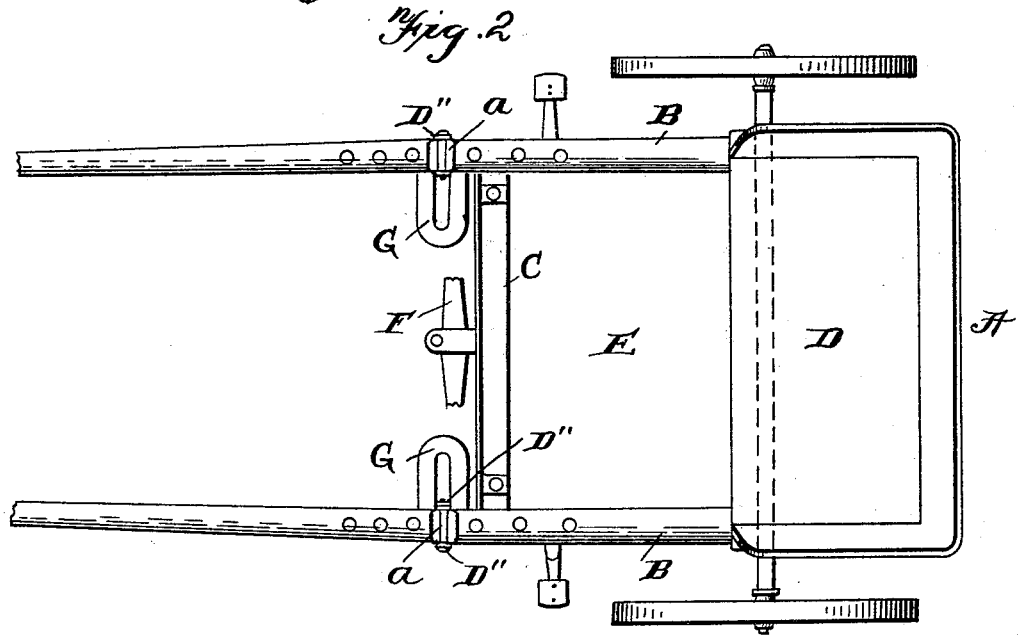
Figure 3:
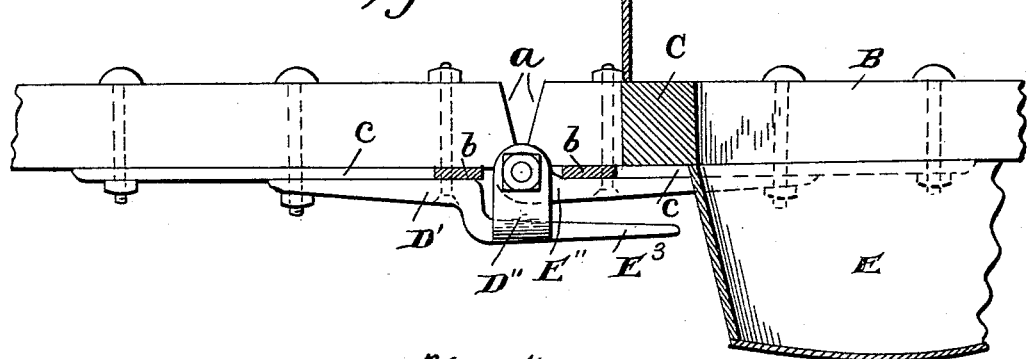
Figure 4:
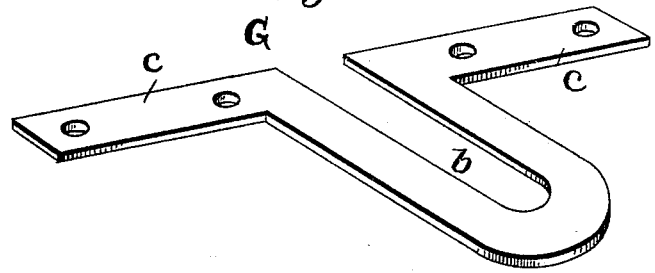
Figure 5:
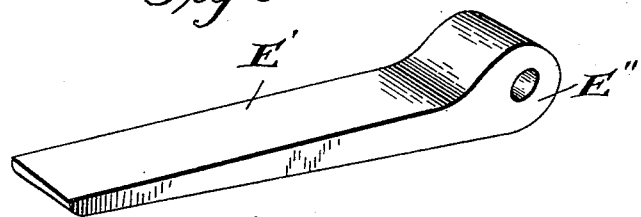
Figure 6:
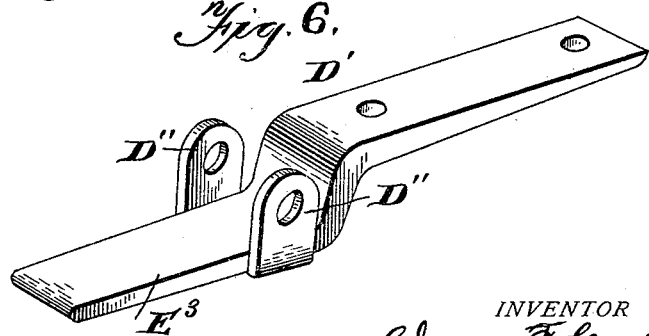

In the accompanying drawings, Figure 1 is a perspective view of a vehicle with my invention applied thereto. Fig. 2 is a top plan view of the same. Fig. 3 is an enlarged side elevation of the inner ends of the shaft and the adjacent end of the body. Fig. 4 is a detail view of the spring. Fig. 5 is a detail view of one part of the hinge, and Fig. 6 is a detail view of the other part of the hinge.

Referring now to the drawings, A indicates the body of a two-wheeled vehicle. In this instance the body consists of a frame comprising side pieces B, the front cross-bar C, and the seat D. Depending between the seat and the front cross-bar is the foot E of the vehicle. The singletree F is suitably connected with the front cross-bar, as clearly shown. Ordinarily in vehicles of this character the side-bars B are a continuation of the rigid shafts. In my present invention the shafts are cut in two at the points $a$ just at the front edge of the body of the vehicle, and secured to the under side of the adjacent ends of the shaft and the side-bars B are the springs G. These springs consist of horizontally-extending sheet-metal leaves and in plan view consist of the U-shaped portion $b$, having at its end the oppositely-extending arms $c$, which extend at opposite sides of the ends of the shaft and the side-bars and bolted, respectively, to each.

Attached to the under side of the ends of the shaft are the hinged leaves or portions D', having upwardly-extending ears D'', and secured to the under side of the forward ends of the side-bars are the coacting hinged pieces or leaves E', having the upwardly-extending eyes E'', fitting between the ears D''. A bolt passes through these ears, thus comprising a hinged joint for the shaft to the body of the vehicle. Preferably, and as here shown, the bolts $e$, which serve to unite the springs G to the shaft and the side-bars, respectively, serve also to unite the leaves D' and E', which compose the hinge-joint of the shaft.

The meeting ends of the shafts and the side-bars B are separated a suitable distance, and they are cut away at an angle upwardly, as shown at the point $a$, to permit a relative play between the body and the shaft.

The leaf D', connected to the shaft, is provided with a rearwardly-extending arm $E^3$ for the purpose of limiting the upward movement of the body or the downward movement of the shaft by reason of this arm engaging the under side of the side-bars B or the hinge-leaf E', secured thereto. The cut-away portion $a$ of the shaft is of a degree to limit the downward movement of the body in respect to the shaft to the limit it is desired the body should move in that direction. The same is true in respect to the arm $E^3$, in that it is to limit the extreme upward movement of the body in respect to the shaft.

Owing to the peculiar construction of the spring G, the shafts are made as rigid against lateral movement as they would be if formed rigidly, as usual.

The constructions herein shown and described are simple and cheap, and yet very effective for the purpose intended, and will relieve the body of two-wheeled vehicles of the jolting and jarring to which the ordinary two-wheeled vehicle or cart is subjected.

Having thus described my invention, what I claim, and desire to secure by Letters Patent, is—

1. The combination with a two-wheeled vehicle, of the shafts, and a U-shaped spring having one of its ends connected with the body and its opposite end connected with the shaft, the U-shaped portion being disconnected, substantially as described.

2. In a two-wheeled vehicle the combination of the body, the shafts, of U-shaped horizontally-extending flat springs having one of their ends connected to the body and their opposite ends connected with the shaft and the U-shaped portion disconnected, substantially as described.

3. In a two-wheeled vehicle the combination of the side-bars, shafts in a line therewith, of horizontally-projecting U-shaped springs having right-angle oppositely-extending arms, one of the arms of the spring connected with the side-bars and its opposite arm connected to the shaft, the U-shaped portion of the spring being disconnected, substantially as described.

4. A two-wheeled vehicle comprising the body, separate and independent shafts, hinges connecting the under sides of the shafts with the body, and flat horizontally-extending U-shaped springs having one end connected with the body and their opposite ends connected with the shafts, the U-shaped portion being disconnected and in a line with the pivotal point of the hinges, substantially as described.

In testimony whereof I have hereunto set my hand in the presence of two subscribing witnesses.

CHARLES F. CARLSON.

Witnesses:
J. C. AXTELL,
HIRAM K. ANALEY.